US011556598B2

(12) United States Patent
Glance

(10) Patent No.: US 11,556,598 B2
(45) Date of Patent: *Jan. 17, 2023

(54) EXTRACTING STRUCTURED DATA FROM WEBLOGS

(71) Applicant: The Nielsen Company (US), LLC, New York, NY (US)

(72) Inventor: Natalie Glance, Pittsburgh, PA (US)

(73) Assignee: BUZZMETRICS, LTD., Herzliya Pituach (IL)

( * ) Notice: Subject to any disclaimer, the term of this patent is extended or adjusted under 35 U.S.C. 154(b) by 1040 days.

This patent is subject to a terminal disclaimer.

(21) Appl. No.: 16/247,523

(22) Filed: Jan. 14, 2019

(65) Prior Publication Data
US 2019/0147005 A1 May 16, 2019

Related U.S. Application Data

(63) Continuation of application No. 14/881,071, filed on Oct. 12, 2015, now Pat. No. 10,180,986, which is a
(Continued)

(51) Int. Cl.
*G06F 16/28* (2019.01)
*G06F 16/951* (2019.01)
(Continued)

(52) U.S. Cl.
CPC .......... *G06F 16/951* (2019.01); *G06F 16/245* (2019.01); *G06F 16/28* (2019.01);
(Continued)

(58) Field of Classification Search
CPC ...... G06F 16/951; G06F 16/245; G06F 16/28; G06F 16/80; G06F 16/958
See application file for complete search history.

(56) References Cited

U.S. PATENT DOCUMENTS 3,950,618 A 4/1976 Bloisi
5,041,972 A 8/1991 Frost
(Continued)

FOREIGN PATENT DOCUMENTS

| EP | 1052582 | 11/2000 |
|---|---|---|
| WO | 0017824 | 3/2000 |
| WO | 0197070 | 12/2001 |

OTHER PUBLICATIONS

Adamic et al., "The Political Blogosphere and the 2004 U.S. Election: Divided They Blog," Proceeding WWW—2005 2nd Annual Workshop on the Weblogging Ecosytem, Chiba, Japan, Mar. 4, 2005, 16 pages.
(Continued)

*Primary Examiner* — Apu M Mofiz
*Assistant Examiner* — Cindy Nguyen
(74) *Attorney, Agent, or Firm* — Hanley, Flight & Zimmerman, LLC

(57) ABSTRACT

Methods and apparatus for extracting structured data from weblogs are disclosed. In some examples, the methods and apparatus include a web crawler to access a home page of a weblog, and identify a feed associated with the weblog. The methods and apparatus also include a feed finder to determine whether items in the feed contain sufficient content for feed-guided segmentation. The methods and apparatus also include a feed classifier to determine whether the items in the feed contain full content of the weblog. The methods and apparatus also include a wrapper to map data found in the feed into a representation of a weblog post, and screen scrape the weblog into the representation of the weblog post.

25 Claims, 1 Drawing Sheet

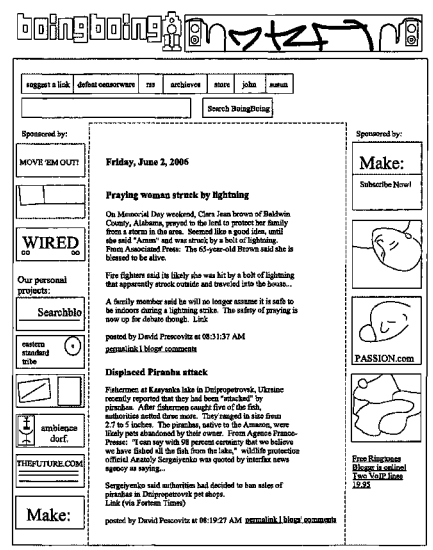

Related U.S. Application Data continuation of application No. 11/454,301, filed on Jun. 16, 2006, now Pat. No. 9,158,855.

(60) Provisional application No. 60/691,200, filed on Jun. 16, 2005.

(51) Int. Cl.
*G06F 16/80* (2019.01)
*G06F 16/245* (2019.01)
*G06F 16/958* (2019.01)
*G06F 40/205* (2020.01)

(52) U.S. Cl.
CPC ............ *G06F 16/80* (2019.01); *G06F 16/958* (2019.01); *G06F 40/205* (2020.01)

(56) References Cited

U.S. PATENT DOCUMENTS

| | | | |
|---|---|---|---|
| 5,077,785 A | 12/1991 | Monson | |
| 5,124,911 A | 6/1992 | Sack | |
| 5,301,109 A | 4/1994 | Landauer et al. | |
| 5,317,507 A | 5/1994 | Gallant | |
| 5,321,833 A | 6/1994 | Chang et al. | |
| 5,371,673 A | 12/1994 | Fan | |
| 5,495,412 A | 2/1996 | Thiessen | |
| 5,519,608 A | 5/1996 | Kupiec | |
| 5,537,618 A | 7/1996 | Boulton et al. | |
| 5,659,732 A | 8/1997 | Kirsch | |
| 5,659,742 A | 8/1997 | Beattie et al. | |
| 5,668,953 A | 9/1997 | Sloo | |
| 5,671,333 A | 9/1997 | Catlett et al. | |
| 5,675,710 A | 10/1997 | Lewis | |
| 5,696,962 A | 12/1997 | Kupiec | |
| 5,754,939 A | 5/1998 | Herz et al. | |
| 5,761,383 A | 6/1998 | Engel et al. | |
| 5,778,363 A | 7/1998 | Light | |
| 5,794,412 A | 8/1998 | Ronconi | |
| 5,819,285 A | 10/1998 | Damico et al. | |
| 5,822,744 A | 10/1998 | Kesel | |
| 5,836,771 A | 11/1998 | Ho et al. | |
| 5,845,278 A | 12/1998 | Kirsch et al. | |
| 5,857,179 A | 1/1999 | Vaithyanathan et al. | |
| 5,884,302 A | 3/1999 | Ho | |
| 5,895,450 A | 4/1999 | Sloo | |
| 5,911,043 A | 6/1999 | Duffy et al. | |
| 5,920,854 A | 7/1999 | Kirsch et al. | |
| 5,924,094 A | 7/1999 | Sutter | |
| 5,950,172 A | 9/1999 | Klingman | |
| 5,950,189 A | 9/1999 | Cohen et al. | |
| 5,953,718 A | 9/1999 | Wical | |
| 5,974,412 A | 10/1999 | Hazlehurst et al. | |
| 5,983,214 A | 11/1999 | Lang et al. | |
| 5,983,216 A | 11/1999 | Kirsch et al. | |
| 6,006,221 A | 12/1999 | Liddy et al. | |
| 6,012,053 A | 1/2000 | Pant et al. | |
| 6,021,409 A | 2/2000 | Burrows | |
| 6,026,387 A | 2/2000 | Kesel | |
| 6,026,388 A | 2/2000 | Liddy et al. | |
| 6,029,161 A | 2/2000 | Lang et al. | |
| 6,029,195 A | 2/2000 | Herz | |
| 6,032,145 A | 2/2000 | Beall et al. | |
| 6,035,294 A | 3/2000 | Fish | |
| 6,038,610 A | 3/2000 | Belfiore et al. | |
| 6,061,789 A | 5/2000 | Hauser et al. | |
| 6,064,980 A | 5/2000 | Jacobi et al. | |
| 6,067,539 A | 5/2000 | Cohen | |
| 6,078,892 A | 6/2000 | Anderson et al. | |
| 6,081,793 A | 6/2000 | Challener et al. | |
| 6,094,657 A | 7/2000 | Hailpern et al. | |
| 6,098,066 A | 8/2000 | Snow et al. | |
| 6,112,203 A | 8/2000 | Bharat et al. | |
| 6,119,933 A | 9/2000 | Wong et al. | |
| 6,138,113 A | 10/2000 | Dean et al. | |
| 6,138,128 A | 10/2000 | Perkowitz et al. | |
| 6,169,986 B1 | 1/2001 | Bowman et al. | |
| 6,185,558 B1 | 2/2001 | Bowman et al. | |
| 6,192,360 B1 | 2/2001 | Dumais et al. | |
| 6,202,068 B1 | 3/2001 | Kraay et al. | |
| 6,233,575 B1 | 5/2001 | Agrawal et al. | |
| 6,236,977 B1 | 5/2001 | Verba et al. | |
| 6,236,980 B1 | 5/2001 | Reese | |
| 6,236,987 B1 | 5/2001 | Horowitz et al. | |
| 6,236,991 B1 | 5/2001 | Frauenhofer et al. | |
| 6,260,041 B1 | 7/2001 | Gonzalez et al. | |
| 6,266,664 B1 | 7/2001 | Russell-Falla et al. | |
| 6,269,362 B1 | 7/2001 | Broder et al. | |
| 6,278,990 B1 | 8/2001 | Horowitz | |
| 6,289,342 B1 | 9/2001 | Lawrence et al. | |
| 6,304,864 B1 | 10/2001 | Liddy et al. | |
| 6,308,176 B1 | 10/2001 | Bagshaw | |
| 6,314,420 B1 | 11/2001 | Lang et al. | |
| 6,324,648 B1 | 11/2001 | Grantges, Jr. | |
| 6,334,131 B2 | 12/2001 | Chakrabarti et al. | |
| 6,360,215 B1 | 3/2002 | Judd et al. | |
| 6,362,837 B1 | 3/2002 | Ginn | |
| 6,366,908 B1 | 4/2002 | Chong et al. | |
| 6,377,946 B1 | 4/2002 | Okamoto et al. | |
| 6,385,586 B1 | 5/2002 | Dietz | |
| 6,393,460 B1 | 5/2002 | Gruen et al. | |
| 6,401,118 B1 | 6/2002 | Thomas | |
| 6,411,936 B1 | 6/2002 | Sanders | |
| 6,418,433 B1 | 7/2002 | Chakrabarti et al. | |
| 6,421,675 B1 | 7/2002 | Ryan et al. | |
| 6,434,549 B1 | 8/2002 | Linetsky et al. | |
| 6,473,794 B1 | 10/2002 | Guheen et al. | |
| 6,493,703 B1 | 12/2002 | Knight et al. | |
| 6,507,866 B1 | 1/2003 | Barchi | |
| 6,510,513 B1 | 1/2003 | Danieli | |
| 6,513,032 B1 | 1/2003 | Sutter | |
| 6,519,571 B1 | 2/2003 | Guheen et al. | |
| 6,519,631 B1 | 2/2003 | Rosenschein et al. | |
| 6,526,440 B1 | 2/2003 | Bharat | |
| 6,536,037 B1 | 3/2003 | Guheen et al. | |
| 6,539,375 B2 | 3/2003 | Kawasaki | |
| 6,546,390 B1 | 4/2003 | Pollack et al. | |
| 6,553,358 B1 | 4/2003 | Horvitz | |
| 6,571,234 B1 | 5/2003 | Knight et al. | |
| 6,571,238 B1 | 5/2003 | Pollack et al. | |
| 6,574,614 B1 | 6/2003 | Kesel | |
| 6,584,470 B2 | 6/2003 | Veale | |
| 6,606,644 B1 | 8/2003 | Ford et al. | |
| 6,615,166 B1 | 9/2003 | Guheen et al. | |
| 6,622,140 B1 | 9/2003 | Kantrowitz | |
| 6,640,218 B1 | 10/2003 | Golding et al. | |
| 6,651,086 B1 | 11/2003 | Manber et al. | |
| 6,654,813 B1 | 11/2003 | Black et al. | |
| 6,658,389 B1 | 12/2003 | Alpdemir | |
| 6,662,170 B1 | 12/2003 | Dom et al. | |
| 6,678,516 B2 | 1/2004 | Nordman et al. | |
| 6,708,215 B1 | 3/2004 | Hingorani et al. | |
| 6,721,713 B1 | 4/2004 | Guheen et al. | |
| 6,721,734 B1 | 4/2004 | Subasic et al. | |
| 6,751,606 B1 | 6/2004 | Fries et al. | |
| 6,751,683 B1 | 6/2004 | Johnson et al. | |
| 6,757,646 B2 | 6/2004 | Marchisio | |
| 6,772,141 B1 | 8/2004 | Pratt et al. | |
| 6,775,664 B2 | 8/2004 | Lang et al. | |
| 6,778,975 B1 | 8/2004 | Anick et al. | |
| 6,782,393 B1 | 8/2004 | Balabanovic et al. | |
| 6,795,826 B2 | 9/2004 | Flinn et al. | |
| 6,807,566 B1 | 10/2004 | Bates et al. | |
| 6,889,325 B1 | 5/2005 | Sipman et al. | |
| 6,892,944 B2 | 5/2005 | Chung et al. | |
| 6,928,526 B1 | 8/2005 | Zhu et al. | |
| 6,957,186 B1 | 10/2005 | Guheen et al. | |
| 6,978,292 B1 | 12/2005 | Murakami et al. | |
| 6,983,320 B1 | 1/2006 | Thomas et al. | |
| 6,999,914 B1 | 2/2006 | Boerner et al. | |
| 7,039,621 B2 | 5/2006 | Agrafiotis et al. | |
| 7,043,760 B2 | 5/2006 | Holtzman et al. | |
| 7,117,187 B2 | 10/2006 | Agrafiotis et al. | |
| 7,117,368 B2 | 10/2006 | Sako | |
| 7,139,739 B2 | 11/2006 | Agrafiotis et al. | |

(56) References Cited

U.S. PATENT DOCUMENTS

| | | | |
|---|---|---|---|
| 7,146,416 B1 | 12/2006 | Yoo et al. |
| 7,149,698 B2 | 12/2006 | Guheen et al. |
| 7,165,041 B1 | 1/2007 | Guheen et al. |
| 7,185,008 B2 | 2/2007 | Kawatani |
| 7,185,065 B1 | 2/2007 | Holtzman et al. |
| 7,188,078 B2 | 3/2007 | Arnett et al. |
| 7,188,079 B2 | 3/2007 | Arnett et al. |
| 7,197,470 B1 | 3/2007 | Arnett et al. |
| 7,214,298 B2 | 5/2007 | Spence et al. |
| 7,277,919 B1 | 10/2007 | Donoho et al. |
| 7,292,723 B2 | 11/2007 | Tedesco et al. |
| 7,315,826 B1 | 1/2008 | Guheen et al. |
| 7,351,376 B1 | 4/2008 | Quake et al. |
| 7,363,243 B2 | 4/2008 | Arnett et al. |
| 7,401,025 B1 | 7/2008 | Lokitz |
| 7,422,150 B2 | 9/2008 | Chung |
| 7,431,209 B2 | 10/2008 | Chung |
| 7,464,003 B2 | 12/2008 | Pomplun |
| 7,536,389 B1 | 5/2009 | Prabhakar et al. |
| 7,600,017 B2 | 10/2009 | Holtzman et al. |
| 7,818,659 B2 | 10/2010 | Kahn et al. |
| 7,844,483 B2 | 11/2010 | Arnett et al. |
| 7,844,484 B2 | 11/2010 | Arnett et al. |
| 7,865,511 B2 | 1/2011 | Kahn et al. |
| 9,158,855 B2 | 10/2015 | Glance |
| 10,180,986 B2 | 1/2019 | Glance |
| 2001/0011351 A1 | 8/2001 | Sako |
| 2001/0018858 A1 | 9/2001 | Dwek |
| 2001/0020228 A1 | 9/2001 | Cantu et al. |
| 2001/0034708 A1 | 10/2001 | Walker et al. |
| 2001/0042087 A1 | 11/2001 | Kephart et al. |
| 2002/0010691 A1 | 1/2002 | Chen |
| 2002/0019764 A1 | 2/2002 | Mascarenhas |
| 2002/0032772 A1 | 3/2002 | Olstad et al. |
| 2002/0059258 A1 | 5/2002 | Kirkpatrick |
| 2002/0087515 A1 | 7/2002 | Swannack et al. |
| 2002/0103801 A1 | 8/2002 | Lyons |
| 2002/0123988 A1 | 9/2002 | Dean et al. |
| 2002/0133481 A1 | 9/2002 | Smith et al. |
| 2002/0159642 A1 | 10/2002 | Whitney |
| 2002/0188586 A1 | 12/2002 | Veale |
| 2003/0034393 A1 | 2/2003 | Chung |
| 2003/0046144 A1 | 3/2003 | Clark et al. |
| 2003/0062411 A1 | 4/2003 | Chung et al. |
| 2003/0070338 A1 | 4/2003 | Roshkoff |
| 2003/0088532 A1 | 5/2003 | Hampshire, II |
| 2003/0094489 A1 | 5/2003 | Wald |
| 2003/0173404 A1 | 9/2003 | Chung et al. |
| 2004/0024752 A1 | 2/2004 | Manber et al. |
| 2004/0059708 A1 | 3/2004 | Dean et al. |
| 2004/0059729 A1 | 3/2004 | Krupin et al. |
| 2004/0078432 A1 | 4/2004 | Manber et al. |
| 2004/0111412 A1 | 6/2004 | Broder |
| 2004/0122811 A1 | 6/2004 | Page |
| 2004/0181675 A1 | 9/2004 | Hansen |
| 2004/0199498 A1 | 10/2004 | Kapur et al. |
| 2004/0205482 A1 | 10/2004 | Basu et al. |
| 2004/0210561 A1 | 10/2004 | Shen |
| 2005/0049908 A2 | 3/2005 | Hawks |
| 2005/0060340 A1 | 3/2005 | Sommerfield et al. |
| 2005/0114161 A1 | 5/2005 | Garg et al. |
| 2005/0125216 A1 | 6/2005 | Chitrapura et al. |
| 2005/0154686 A1 | 7/2005 | Corston et al. |
| 2006/0004691 A1 | 1/2006 | Sifry |
| 2006/0015737 A1 | 1/2006 | Canard et al. |
| 2006/0041605 A1 | 2/2006 | King et al. |
| 2006/0069589 A1 | 3/2006 | Nigam et al. |
| 2006/0085248 A1 | 4/2006 | Arnett et al. |
| 2006/0155999 A1 | 7/2006 | Holtzman et al. |
| 2006/0173819 A1 | 8/2006 | Watson |
| 2006/0173837 A1 | 8/2006 | Berstis et al. |
| 2006/0173985 A1 | 8/2006 | Moore |
| 2006/0184629 A1 | 8/2006 | Izdepski et al. |
| 2006/0184630 A1 | 8/2006 | Izdepski et al. |
| 2006/0184631 A1 | 8/2006 | Izdepski et al. |
| 2006/0184674 A1 | 8/2006 | Izdepski et al. |
| 2006/0184678 A1 | 8/2006 | Izdepski et al. |
| 2006/0184679 A1 | 8/2006 | Izdepski et al. |
| 2006/0206505 A1 | 9/2006 | Hyder et al. |
| 2006/0230021 A1 | 10/2006 | Diab et al. |
| 2007/0027840 A1 | 2/2007 | Cowling et al. |
| 2007/0143853 A1 | 6/2007 | Tsukamoto |
| 2007/0208614 A1 | 9/2007 | Arnett et al. |
| 2007/0282621 A1 | 12/2007 | Altman et al. |
| 2008/0059791 A1 | 3/2008 | Lee et al. |
| 2008/0262920 A1 | 10/2008 | O'Neill et al. |

OTHER PUBLICATIONS

Adar et al., "Implicit Structure and the Dynamics of Blogspace," Proceedings WWW—2004 Workshop on the Weblogging Ecosystem, New York, NY, Mar. 18, 2004, 8 pages.

Aliod et al., "A Real Word Implementation of Answer Extraction," Department of Computer Science, University of Zurich, Winterthurerstr., Aug. 28, 1998, 6 pages.

Baumes et al., "Sights: A Software System for Finding Coalitions and Leaders in a Social Network," Intelligence and Security Informatics, May 23, 2007, 7 pages.

Bishop, "Arrow Question/Answering Systems," Language Computer Corporation, 1999, 3 pages.

Bizrate's archived website, Jan. 1999, retrieved from <http://web.archive.org/web*/http://www.bizrate.com>, retrieved on Oct. 29, 2004, 22 pages.

Blum, "Empirical Support for Winnow and Weighted-Majority Algorithms: Results on a Calendar Scheduling Domain," Machine Learning, vol. 26, No. 5, 1997, 5 pages.

Bournellis, "Tracking the Hits on Web Sites," Communications International, vol. 22, Issue 9, Sep. 1995, 3 pages.

Business Wire, "Delahaye Group to Offer NetBench: High Level Web-Site Qualitative Analysis and Reporting; NetBench Builds on Systems Provided by I/PRO and Internet Media Services," Business Wire, Inc., May 31, 1995, 3 pages.

Chaum, "Untraceable Electronic Mail, Return Addresses, and Digital Pseudonyms," Communications of the ACM, vol. 24, No. 2, Feb. 1981, 5 pages.

Chaum et al., "A Secure and Privacy-Protecting Protocol for Transmitting Personal Information Between Organizations," Advances in Cryptology-Crypto ,86, Aug. 11, 1986, 53 pages.

Cohen, "Data Integration Using Similarity Joins and a Word-Based Information Representation Language," ACM Transactions on Information Systems, vol. 18, No. 3, Jul. 2000, 34 pages.

Cohn et al., "Active Learning with Statistical Models," Journal of Artificial Intelligence Research vol. 4, Mar. 1996, 17 pages.

D'Astous et al., "Consumer Evaluations of Movies on the Basis of Critics' Judgments," Psychology & Marketing, vol. 16, No. 8, Dec. 1999, 18 pages.

Dagan et al., "Mistake-Driven Learning in Text Categorization," EMNLP'97, 2nd Conference on Empirical Methods in Natural Language Processing, 1997, 9 pages.

Dialogic's archived website, May 12, 2000, retrieved from <http://web.archive.org/web/*/http://www.dialogic.com>, retrieved on Dec. 2, 2003, 34 pages.

Dillon et al., "Marketing Research in a Marketing Environment," Third Edition, Times Mirror/Mosby College Publishing, 1987 (pp. 98, 286, 288), 5 pages.

Eliashberg et al., "Film Critics: Influencers or Predictors?", Journal of Marketing, vol. 61, No. 2, 1997, retrieved from <http://search.proquest.com/printviewfile?accountid=14753>, retrieved on Sep. 27, 2012, 12 pages.

European Patent Office, "Intention to Grant," issued in connection with European Patent Application No. 02744622.8, dated Jul. 28, 2008, 36 pages.

European Patent Office, "Supplementary European Search Report under Article 157(2)(a) EPC," issued in connection with European Patent Application No. 02744622.8, dated Sep. 26, 2007, 3 pages.

EWatch's archived website, May 22, 1998, retrieved from <http://web.archive.org/web/19980522190526/www/ewatch.com/ind_main.html>, retrieved on Sep. 8, 2004, 50 pages.

(56) References Cited

OTHER PUBLICATIONS

Farber, "IP: eWatch and Cybersleuth," Jun. 29, 2000, retrieved from <http://www.interesting-people.org/archives/interesting-people/200006/msg0090.html>, retrieved on Jan. 21, 2005, 4 pages.

Freund et al., "Selective Sampling Using the Query by Committee Algorithm," Machine Learning, vol. 28, 1997, 36 pages.

Ginsburgh et al., "On the Perceived Quality of Movies," Journal of Cultural Economics, vol. 23, No. 4, Nov. 1999, 15 pages.

Glance et al., "Analyzing Online Discussion for Marketing Intelligence," Proceedings WWW—2005 2nd Annual Workshop on the Weblogging Ecosystem, Chiba, Japan, May 10-14, 2005, 2 pages.

Glance et al., "Deriving Marketing Intelligence from Online Discussion," 11th ACM SIGKDD International Conference on Knowledge Discovery and Data Mining, Chicago, IL, Aug. 21-24, 2005, 10 pages.

Glance, Natalie. "Indexing Weblogs One Post at a Time," 2005.

Glance et al. BlogPulse: Automated Trend Discovery for Weblogs, 2004.

Grefenstette et al., "Chapter 10—Validating the Coverage of Lexical Resources for Affect Analysis and Automatically Classifying New Words Along Semantic Axes," Mar. 2006, 16 pages.

Harabagiu et al., "An Intelligent System for Question Answering," University of Southern California, Southern Methodist University, 2000, 5 pages.

Harabagiu et al., "Experiments with Open-Domain Textual Question Answering," Department of Computer Science and Engineering at Southern Methodist University, 2000, 7 pages.

Harabagiu et al., "Mining Textual Answers with Knowledge-Based Indicators," Department of Computer Science and Engineering at Southern Methodist University, 1996 , 5 pages.

Hornaday, "Two Come Out of the Blue; 'There's Something About Mary' and 'Smoke Signals' Make it Big; Film:," The Sun, Aug. 23, 1998, 2 pages.

Housley et al., "Internet X.509 Public Key Infrastructure Certificate and Certificate Revocation List (CRL) Profile," Network Working Group, The Internet Society, Apr. 2002, retrieved from <http://www.ietf.org/rfc/rfc3280.txt>, retrieved on Apr. 30, 2009, 121 pages.

International Searching Authority, "International Preliminary Report on Patentability," issued in connection with International Patent Application No. PCT/US2007/021035, dated Mar. 31, 2009, 9 pages.

International Searching Authority, Written Opinion, issued in connection with International Patent Application No. PCT/US2007/021035, dated Jul. 1, 2008, 8 pages.

International Searching Authority, "International Search Report," issued in connection with International Patent Application No. PCT/US2007/021035, dated Jul. 1, 2008, 1 page.

International Searching Authority, "International Preliminary Report on Patentability," issued in connection with International Patent Application No. PCT/IL2006/000905, dated Feb. 5, 2008, 4 pages.

International Searching Authority, "International Search Report and Written Opinion," issued in connection with International Patent Application No. PCT/IL2006/000905, dated Jul. 2, 2007, 4 pages.

International Searching Authority, "International Search Report," issued in connection with International Patent Application No. PCT/US2005/035321, dated May 8, 2007, 1 page.

International Searching Authority, "International Preliminary Report on Patentability," issued in connection with International Patent Application No. PCT/US2005/035321, dated Jun. 19, 2007, 4 pages.

Joachims, "Text Categorization with Support Vector Machines: Learning with Many Relevant Features," Machine Learning: ECML'98, Tenth European Conference on Machine Learning, 1998, 7 pages.

Khan et al., "Categorizing Web Documents Using Competitive Learning: An Ingredient of a Personal Adapative Agent," International Conference on Neural Networks, vol. 1, Jun. 9-12, 1997, 4 pages.

Katz, "From Sentence Processing to Information Access on the World Wide Web," Artificial Intelligence Laboratory, Massachusetts Institute of Technology, Feb. 27, 1997, retrieved from <http://www.ai.mit.edu/people/boris/webaccess/>, retrieved on Jul. 2, 2001, 20 pages.

Kleppner, Advertising Procedure, 6th Edition, Prentice-Hall, Inc., 1977 (p. 492), 3 pages.

Kotler, Marketng Management, Prentice Hall International Inc., 1997 (pp. 256-257, 617-619, 665-667), 10 pages.

Lenz et al., "Question Answering with Textual CBR," Department of Computer Science, Humboldt University Berlin, D-10099, 1998, 12 pages.

Littlestone, "Learning Quickly When Irrelevant Attributes Abound: A New Linear Threshold Algorithm," Machine Learning, vol. 2, 1988, 34 pages.

Marlow, "Audience, Structure and Authority in the Weblog Community," International Communication Association Conference, MIT Media Laboratory, New Orleans, LA, 2004, 9 pages.

McLachlan et al., "The EM Algortihm and Extensions," Wiley Series in Probability and Statistics, 1997, 302 pages.

McCallum et al., "Text Classification by Bootstrapping with Keywords, EM and Shrinkage," Just Research and Carnegie Mellon University, Pittsburgh, PA, 1999, 7 pages.

Moldovan et al., "Lasso: A Tool for Surfing the Answer Net," Department of Computer Science and Engineering at Southern Methodist University, 1999, 9 pages.

Nakashima et al., Information Filtering for the Newspaper, Communications, Computers and Signal Processing, 10 Years PACRIM 1987-1997—Networking the Pacific Rim, vol. 1, Aug. 20, 1997, 4 pages.

Nanno et al., "Automatic Collection and Monitoring of Japanese Weblogs," WWW2004 Workshop on the Weblogging Ecosytem: Aggregation, Analysis and Dynamics, New York NY, May 17-22, 2004, 7 pages.

Nanno et al. Automatically Collecting, Monitoring and Mining Japanese Weblogs, 2004.

Needel, "Word of Mouth Research Case Study: The Trans Fat Issue—Analysis of online consumer conversation to undersand how the Oreo lawsuit impacted word-of-mouth on trans fats," Buzzmetrics, Aug. 16, 2004, 35 pages.

NetCurrent's archived website, Jun. 22, 2000 and Sep. 18, 2000, retrieved from <http://web.archive.org/web/2000622024845/www.netcurrents.com/report/sample.html>, retreived on Jan. 17, 2005, 16 pages.

Pang et al., "Thumbs Up? Sentiment Classification Using Machine Learning Techniques," EMNLP '02 Proceedings of the ACL-02 conference on Empirical Methods in Natural Language Processing, vol. 10, 2002, 8 pages.

Reguly, "Caveat Emptor Rules on the Internet," The Globe and Mail (Canada): Report on Business Column, p. B2, Apr. 10, 1999, 2 pages.

Reinartz, "Customer Lifetime Value Analysis: An Integrated Empirical Framework for Measurement and Explanation," Dissertation, University of Houston, Apr. 1999, 68 pages.

Thomas, "International Marketing," International Textbook Company, 1971, 3 pages.

Trigaux, "Cyberwar Erupts Over Free Speech Across Florida, Nation," Knight-Ridder Tribune Business News, May 29, 2000, 4 pages.

Tull et al., "Marketing Research Measurement and Method," MacMillan Publishing Company, 1984 (pp. 102, 103, 114, 115, 200, 201, 256), 9 pages.

United States Patent and Trademark Office, "Non-Final Office Action," issued in connection with U.S. Appl. No. 9/695,016, dated Jul. 21, 2004, 27 pages.

United States Patent and Trademark Office, "Requirement for Restriction/ Election," issued in connection with U.S. Appl. No. 9/695,016, dated Jan. 26, 2005, 6 pages.

United States Patent and Trademark Office, "Non-Final Office Action," issued in connection with U.S. Appl. No. 9/695,016, dated May 19, 2005, 13 pages.

United States Patent and Trademark Office, "Final Office Action," issued in connection with U.S. Appl. No. 9/695,016, dated Nov. 2, 2005, 13 pages.

(56) References Cited

OTHER PUBLICATIONS

United States Patent and Trademark Office, "Final Office Action," issued in connection with U.S. Appl. No. 9/686,516, dated May 10, 2006, 34 pages.

United States Patent and Trademark Office, "Final Office Action," issued in connection with U.S. Appl. No. 9/686,516, dated Jun. 29, 2005, 21 pages.

United States Patent and Trademark Office, "Requirement for Restriction/Election," issued in connection with U.S. Appl. No. 9/686,516, dated Oct. 19, 2004, 6 pages.

United States Patent and Trademark Office, "Notice of Allowance," issued in connection with U.S. Appl. No. 9/686,516, dated Jan. 24, 2007, 9 pages.

United States Patent and Trademark Office, "Non-Final Office Action," issued in connection with U.S. Appl. No. 9/686,516, dated Jan. 28, 2005, 19 pages.

United States Patent and Trademark Office, "Non-Final Office Action," issued in connection with U.S. Appl. No. 9/686,516, dated Nov. 22, 2005, 25 pages.

United States Patent and Trademark Office, "Notice of Allowance," issued in connection with U.S. Appl. No. 9/796,961, dated Feb. 24, 2003, 4 pages.

United States Patent and Trademark Office, "Non-Final Office Action," issued in connection with U.S. Appl. No. 11/372,191, dated Dec. 23, 2008, 6 pages.

United States Patent and Trademark Office, "Notice of Allowance," issued in connection with U.S. Appl. No. 11/710,743, dated Jul. 21, 2010, 6 pages.

United States Patent and Trademark Office, "Final Office Action," issued in connection with U.S. Appl. No. 11/710,743, dated Jan. 12, 2009, 17 pages.

United States Patent and Trademark Office, "Final Office Action," issued in connection with U.S. Appl. No. 11/710,743, dated Jan. 8, 2010, 21 pages.

United States Patent and Trademark Office, "Non-Final Office Action," issued in connection with U.S. Appl. No. 11/710,743, dated Jul. 29, 2008, 12 pages.

United States Patent and Trademark Office, "Non-Final Office Action," issued in connection with U.S. Appl. No. 11/710,743, dated Aug. 7, 2009, 18 pages.

United States Patent and Trademark Office, "Pre-Brief Appeal Conference Decision," issued in connection with U.S. Appl. No. 11/710,743, mailed Jul. 20, 2009, 2 pages.

United States Patent and Trademark Office, "Notice of Allowance," issued in connection with U.S. Appl. No. 11/710,742, dated Jul. 26, 2010, 10 pages.

United States Patent and Trademark Office, "Notice of Allowance," issued in connection with U.S. Appl. No. 11/710,742, dated Jun. 8, 2009, 10 pages.

United States Patent and Trademark Office, "Notice of Allowance," issued in connection with U.S. Appl. No. 11/710,742, dated Jan. 30, 2009, 10 pages.

United States Patent and Trademark Office, "Final Office Action," issued in connection with U.S. Appl. No. 11/710,742, dated Aug. 7, 2008, 12 pages.

United States Patent and Trademark Office, "Non-Final Office Action," issued in connection with U.S. Appl. No. 11/710,742, dated Jan. 5, 2010, 5 pages.

United States Patent and Trademark Office, "Non-Final Office Action," issued in connection with U.S. Appl. No. 11/710,742, dated Oct. 3, 2007, 10 pages.

United States Patent and Trademark Office, "Notice of Allowance," issued in connection with U.S. Appl. No. 11/710,742, dated Dec. 8, 2008, 10 pages.

United States Patent and Trademark Office, "Notice of Allowance," issued in connection with U.S. Appl. No. 11/245,542, dated Oct. 8, 2008, 5 pages.

United States Patent and Trademark Office, "Notice of Allowance," issued in connection with U.S. Appl. No. 11/245,542, dated Aug. 21, 2008, 4 pages.

United States Patent and Trademark Office, "Notice of Allowance," issued in connection with U.S. Appl. No. 11/245,542, dated Dec. 16, 2008, 4 pages.

United States Patent and Trademark Office, "Final Office Action," issued in connection with U.S. Appl. No. 11/245,542, dated Jun. 12, 2008, 9 pages.

United States Patent and Trademark Office, "Non-Final Office Action," issued in connection with U.S. Appl. No. 11/245,542, dated Oct. 9, 2007, 11 pages.

United States Patent and Trademark Office, "Notice of Allowance," issued in connection with U.S. Appl. No. 11/651,661, dated May 19, 2009, 28 pages.

United States Patent and Trademark Office, "Non-Final Office Action," issued in connection with U.S. Appl. No. 11/651,661, dated Jun. 4, 2008, 11 pages.

United States Patent and Trademark Office, "Non-Final Office Action," issued in connection with U.S. Appl. No. 11/651,661, dated Aug. 3, 2007, 14 pages.

United States Patent and Trademark Office, "Non-Final Office Action," issued in connection with U.S. Appl. No. 11/651,661, dated Dec. 4, 2008, 10 pages.

United States Patent and Trademark Office, "Final Office Action," issued in connection with U.S. Appl. No. 12/955,586, dated Jan. 28, 2015, 34 pages.

United States Patent and Trademark Office, "Final Office Action," issued in connection with U.S. Appl. No. 12/955,586, dated Dec. 5, 2013, 25 pages.

United States Patent and Trademark Office, "Advisory Action," issued in connection with U.S. Appl. No. 12/955,586, dated Jan. 21, 2016, 2 pages.

United States Patent and Trademark Office, "Examiner's Answer to Appeal Brief," issued in connection with U.S. Appl. No. 12/955,586, mailed Mar. 1, 2016, 60 pages.

United States Patent and Trademark Office, "Examiner's Answer to Appeal Brief," issued in connection with U.S. Appl. No. 12/955,586, mailed Aug. 4, 2014, 33 pages.

United States Patent and Trademark Office, "Requirement for Restriction/Election," issued in connection with U.S. Appl. No. 12/955,586, dated Jun. 6, 2013, 6 pages.

United States Patent and Trademark Office, "Non-Final Office Action," issued in connection with U.S. Appl. No. 12/955,586, dated Ilash, 2013, 26 pages.

United States Patent and Trademark Office, "Notice of Allowance," issued in connection with U.S. Appl. No. 9/879,220, dated Dec. 1, 2006, 8 pages.

United States Patent and Trademark Office, "Final Office Action," issued in connection with U.S. Appl. No. 9/879,220, dated Apr. 28, 2005, 16 pages.

United States Patent and Trademark Office, "Non-Final Office Action," issued in connection with U.S. Appl. No. 9/879,220, dated Dec. 2, 2004, 15 pages.

United States Patent and Trademark Office, "Non-Final Office Action," issued in connection with U.S. Appl. No. 9/879,220, dated Mar. 28, 2006, 19 pages.

United States Patent and Trademark Office, "Notice of Allowance," issued in connection with U.S. Appl. No. 10/801,758, dated Jan. 6, 2010, 8 pages.

United States Patent and Trademark Office, "Non-Final Office Action," issued in connection with U.S. Appl. No. 10/801,758, dated Apr. 29, 2009, 41 pages.

United States Patent and Trademark Office, "Final Office Action," issued in connection with U.S. Appl. No. 10/801,758, dated Oct. 1, 2008, 40 pages.

United States Patent and Trademark Office, "Non-Final Office Action," issued in connection with U.S. Appl. No. 10/801,758, dated Mar. 7, 2008, 31 pages.

United States Patent and Trademark Office, "Notice of Allowance," issued in connection with U.S. Appl. No. 11/239,695, dated Sep. 21, 2006, 9 pages.

United States Patent and Trademark Office, "Notice of Allowance," issued in connection with U.S. Appl. No. 11/239,695, dated Dec. 13, 2006, 9 pages.

(56) References Cited

OTHER PUBLICATIONS

United States Patent and Trademark Office, "Non-Final Office Action," issued in connection with U.S. Appl. No. 11/239,695, dated 2006, 9 pages.

United States Patent and Trademark Office, "Notice of Allowance," issued in connection with U.S. Appl. No. 11/239,632, dated Sep. 21, 2006, 8 pages.

United States Patent and Trademark Office, "Notice of Allowance," issued in connection with U.S. Appl. No. 11/239,632, dated Dec. 18, 2006, 9 pages.

United States Patent and Trademark Office, "Non-Final Office Action," issued in connection with U.S. Appl. No. 11/239,632, dated Apr. 5, 2006, 9 pages.

United States Patent and Trademark Office, "Non-Final Office Action," issued in connection with U.S. Appl. No. 11/364,169, dated Jun. 11, 2007, 8 pages.

United States Patent and Trademark Office, "Final Office Action," issued in connection with U.S. Appl. No. 11/364,169, dated Apr. 23, 2008, 10 pages.

United States Patent and Trademark Office, "Advisory Action," issued in connection with U.S. Appl. No. 11/364,169, dated Jul. 10, 2008, 4 pages.

United States Patent and Trademark Office, "Non-Final Office Action," issued in connection with U.S. Appl. No. 11/517,418, dated Aug. 19, 2008, 9 pages.

United States Patent and Trademark Office, "Non-Final Office Action," issued in connection with U.S. Appl. No. 11/897,984, dated May 22, 2008, 17 pages.

United States Patent and Trademark Office, "Non-Final Office Action," issued in connection with U.S. Appl. No. 11/897,984, dated Apr. 21, 2009, 18 pages.

United States Patent and Trademark Office, "Advisory Action," issued in connection with U.S. Appl. No. 11/897,984, dated Jan. 21, 2009, 3 pages.

United States Patent and Trademark Office, "Final Office Action," issued in connection with U.S. Appl. No. 11/897,984, dated Nov. 13, 2008, 20 pages.

United States Patent and Trademark Office, "Notice of Allowance," issued in connection with U.S. Appl. No. 11/897,984, dated Oct. 7, 2009, 10 pages.

United States Patent and Trademark Office, "Non-Final Office Action," issued in connection with U.S. Appl. No. 11/517,417, dated Dec. 17, 2008, 6 pages.

United States Patent and Trademark Office, "Notice of Allowance," issued in connection with U.S. Appl. No. 11/517,417, dated May 29, 2009, 6 pages.

United States Patent and Trademark Office, "Final Office Action," issued in connection with U.S. Appl. No. 11/239,696, dated Sep. 12, 2007, 8 pages.

United States Patent and Trademark Office, "Non-Final Office Action," issued in connection with U.S. Appl. No. 11/239,696, dated Sep. 22, 2006, 11 pages.

United States Patent and Trademark Office, "Notice of Allowance," issued in connection with U.S. Appl. No. 11/239,696, dated Nov. 21, 2007, 4 pages.

United States Patent and Trademark Office, "Advisory Action," issued in connection with U.S. Appl. No. 11/454,301, dated Jun. 25, 2009, 3 pages.

United States Patent and Trademark Office, "Examiner's Answer to Appeal Brief," issued in connection with U.S. Appl. No. 11/454,301, mailed Mar. 12, 2012, 17 pages.

United States Patent and Trademark Office, "Final Office Action," issued in connection with U.S. Appl. No. 11/454,301, dated Apr. 7, 2009, 17 pages.

United States Patent and Trademark Office, "Final Office Action," issued in connection with U.S. Appl. No. 11/454,301, dated Mar. 25, 2011, 16 pages.

United States Patent and Trademark Office, "Non-Final Office Action," issued in connection with U.S. Appl. No. 11/454,301, dated Sep. 18, 2008, 17 pages.

United States Patent and Trademark Office, "Non-Final Office Action," issued in connection with U.S. Appl. No. 11/454,301, dated Jul. 13, 2010, 16 pages.

United States Patent and Trademark Office, "Notice of Allowance," issued in connection with U.S. Appl. No. 11/454,301, dated Jun. 1, 2015, 8 pages.

United States Patent and Trademark Office, "Pre-Brief Appeal Conference Decision," issued in connection with U.S. Appl. No. 11/454,301, mailed Aug. 3, 2011, 2 pages.

United States Patent and Trademark Office, "Pre-Brief Appeal Conference Decision," issued in connection with U.S. Appl. No. 11/454,301, mailed May 5, 2010, 2 pages.

United States Patent and Trademark Office, "Patent Board Decision," issued in connection with U.S. Appl. No. 11/454,301, mailed Feb. 6, 2015, 10 pages.

Voorhees, "The TREC-8 Question Answering Track Report," National Institute of Standards and Technology, 1999, 6 pages.

Wiebe et al., "Identifying Collocations for Recognizing Opinions," Proceedings of ACL/EACL'01 Workshop on Collocation, Toulouse, France, Apr. 9, 2001, 9 pages.

Yang, "An Evaluation of Statistical Approaches to Text Categorization," CMU-CS-97-127, Carnegie Mellon University, Pittsburgh, PA, Apr. 10, 1997, 12 pages.

zagat.com, retrieved from www.zagat.com as archived on Feb. 1999, 1 page.

zagat.com, retrieved from http://web.archive.org/web/199990418081713/www.zagat.com/partners.asp>, as archived on Apr. 29, 1999, retrieved Jun. 18, 2004, 34 pages.

Zufryden "New Film Website Promotion and Box-Office Performance," Journal of Advertising Research, Jan.-Apr. 2000, 11 pages.

United States Patent and Trademark Office, "Non-Final Office Action," issued in connection with U.S. Appl. No. 14/881,071, dated Feb. 5, 2018, 69 pages.

United States Patent and Trademark Office, "Notice of Allowance and Fee(s) Due," issued in connection with U.S. Appl. No. 14/881,071, dated Sep. 4, 2018, 11 pages.

Glance et al., "BlogPulse: Automated Trend Discover for Weblogs," Intelliseek Applied Research Center, May 17-22, 2004, 8 pages.

Glance, "Indexing Weblogs One Post at a Time," Intelliseek Applied Research Center, 2005. 4 pages.

United States Patent and Trademark Office, "Non-Final Office Action," dated Feb. 5, 2018 in connection with U.S. Appl. No. 14/881,071, 7 pages.

United States Patent and Trademark Office, "Notice of Allowance," dated Sep. 4, 2018 in connection with U.S. Appl. No. 14/881,071, 5 pages.

| suggest a link | defeat censorware | rss | archieves | store | john | susun |

Search BoingBoing

Sponsored by:

MOVE 'EM OUT!

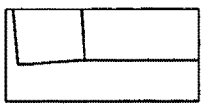

WIRED
oo          oo

Our personal projects:

Searchblo eastern standard tribe ambience dorf.

THEFUTURE.COM

Make:

Friday, June 2, 2006

Praying woman struck by lightning

On Memorial Day weekend, Clara Jean brown of Baldwin County, Alabama, prayed to the lord to protect her family from a storm in the area. Seemed like a good idea, until she said "Amen" and was struck by a bolt of lightning. From Associated Press: The 65-year-old Brown said she is blessed to be alive.

Fire fighters said its likely she was hit by a bolt of lightning that apparently struck outside and traveled into the house...

A family member said he will no longer assume it is safe to be indoors during a lightning strike. The safety of praying is now up for debate though. Link posted by David Prescovitz at 08:31:37 AM permalink 1 blogs' comments

Displaced Piranha attack

Fishermen at Kasyanka lake in Dnipropetrovsk, Ukraine recently reported that they had been "attacked" by piranhas. After fishermen caught five of the fish, authorities netted three more. They ranged in size from 2.7 to 5 inches. The piranhas, native to the Amazon, were likely pets abandoned by their owner. From Agence France-Presse: "I can say with 98 percent certainty that we believe we have fished all the fish from the lake," wildlife protection official Anatoly Sergeiyenko was quoted by interfax news agency as saying...

Sergeiyenko said authorities had decided to ban sales of piranhas in Dnipropetrovsk pet shops.
Link (via Fortean Times)

posted by David Pescovitz at 08:19:27 AM  permalink 1 blogs' comments

Sponsored by:

Make:

Subscribe Now!

PASSION.com

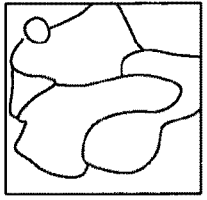

Free Ringtones
Bloggr is online!
Two VoIP lines
19.95

EXTRACTING STRUCTURED DATA FROM WEBLOGS

CROSS-REFERENCE TO RELATED APPLICATIONS

This application arises from a continuation of U.S. patent application Ser. No. 14/881,071, which was filed on Oct. 12, 2015, which is a continuation of U.S. patent application Ser. No. 11/454,301, which was filed on Jun. 16, 2006, which claims the priority of U.S. Provisional Patent Application Ser. No. 60/691,200, which was filed Jun. 16, 2005. U.S. patent application Ser. No. 14/881,071, U.S. patent application Ser. No. 11/454,301 and U.S. Provisional Patent Application Ser. No. 60/691,200 are incorporated by reference in their entireties.

BACKGROUND

Weblogging or "blogging" has emerged in the past few years as a new grassroots publishing medium. Like electronic mail and the web itself, weblogging has taken off and by some estimates the number of weblogs is doubling every 6 months. As of June 2006, BlogPulse estimates place the number of active weblogs at nearly 10 million blogs, of which about 36% have had at least one post in the past 3 months. BlogPulse finds approximately 60,000 new weblogs each day. Statistics published by other blog search engines such as Technorati and PubSub are similar. However, these estimates may well be excluding large numbers of non-English language weblogs.

A weblog is commonly defined as a web page with a set of dated entries, in reverse chronological order, maintained by its writer via a weblog publishing software tool. We can define each entry as a set of one or more time-stamped posts; an author may typically post several times a day. This is a matter a style, as some authors post at most once a day in an all-inclusive entry. Others prefer to micro-post, making each published item a separate post in the day's entry.

Due to the popularity of weblogs, there is a need for a method of searching individual posts within weblogs. The present invention addresses this need.

BRIEF DESCRIPTION OF THE DRAWINGS

FIG. 1 shows a sample page from a weblog.

DETAILED DESCRIPTION

1. Overview

The present invention provides a process for segmenting weblogs into posts. Weblogs can facilitate communication and dissemination of content in any environment having two or more workstations in mutual communication. While weblogs are typically hosted by a server connected to the Internet, the concept can include other types of networks, such as local area networks (LANs), wide area networks (WANs), and public data networks, by which client workstations obtain data from a server workstation.

Each workstation may comprise a microcomputer such as a personal computer, for example, including a system bus that is connected to a central processing unit (CPU) and to memory, including read only memory (ROM) and random access memory (RAM). The system bus can be connected, via appropriate interface known to persons skilled in the art, to various input/output devices, including additional non-volatile data storage devices, video and audio adapters, keyboard, mouse, and other devices that provide input to the workstation or receive output from the workstation. The Workstation can also include a data port for communicating with other constituents of collaborative data processing environment. The data port may be a serial port for linking workstation to a modem or a communications adapter for connecting workstation to a LAN.

Each workstation also typically includes software programs that are stored on the data storage devices or retrieved from other parts of collaborative data processing system and loaded into RAM and then into CPU for execution. Among those programs is a client program that receives messages from, and transmits messages to, other workstations connected to the network.

Web search engines such as Google, Yahoo, and MSN Search index the entire content of a web page typically every few days. However, for weblogs, users want to be able to search over individual posts, and in near real-time. Weblog search portals such as Technorati, Feedster, Pub Sub and BlogPulse have gained in popularity over the past year and a half, as people begin to turn to weblogs to get up-to-the-minute breaking news and to get fresh angles on news stories.

In addition, marketers have awakened to the possibility of mining consumer sentiment from weblogs. In order to produce accurate analytics, it is first necessary to be to identify individual weblog posts. Examples of consumer sentiment analytics are the buzz surrounding a product (number of mentions), number of links to a company website, trends in number of mentions and number of links, and ratio of positive vs. negative mentions. Glance, M. Hurst, K. Nigam, M. Siegler, R. Stockton, and T. Tomokiyo. Analyzing online discussion for marketing intelligence. In Proceedings WWW-2005, Chiba, Japan, 2005 (incorporated herein by reference).

Researchers as well are turning to blogs to gauge opinion and community structure. For example, Adamic and Glance recently analyzed the linking behavior of political bloggers during the 2004 U.S. Presidential Election and found that conservative bloggers link to each other more frequently and in a denser pattern than liberal bloggers. Adamic and N. Glance, The political blogosphere and the 2004 U.S. election: Divided they blog, In Proceedings WWW-2005 2nd Annual Workshop on the Weblogging Ecosystem, Chiba, Japan, 2005 (incorporated herein by reference). Marlow has studied the structure and authority in weblogs using inter-post citation counts. Marlow. Audience, structure and authority in the weblog community, In International Communication Association Conference, New Orleans, La., 2004 (incorporated herein by reference). Adar et. al. have explored how memes thread through the blogsphere from post to post. Adar, L. Zhang, L. A. Adamic, and R. M. Lukose, Implicit structure and the dynamics of blogspace, In Proceedings WWW-2004 Workshop on the Weblogging Ecosystem, New York City, N.Y., 2004 (incorporated herein by reference). The Global Attention Profiles project tracks the attention that bloggers pay to different nations of the world, in comparison with selected mainstream media outlets.

To enable sophisticated analytics over weblogs, a blog search engine typically uses an indexing mechanism that indexes a weblog one post at time, as opposed to one HTML page at a time. In order to index blogs one post at a time, the indexing system should be able to segment the weblog HTML into individual posts and extract meta-data associated with the posts, such as the posting date, title, permalink, and author.

The present invention provides a method for segmenting weblogs into individual posts using a combination of weblog feeds (such as RSS and Atom) and model-based wrapper segmentation. RSS is a family of web feed formats, specified in XML and used for Web syndication. Web feeds provide web content or summaries of web content together with links to the full versions of the content, and other metadata. RSS, in particular, delivers this information as an XML file called an RSS feed, webfeed, RSS stream, or RSS channel. In addition to facilitating syndication, web feeds allow a website's frequent readers to track updates on the site using an aggregator. Atom is the name of a specific web feed format. Web feeds, from a user's perspective, allow Internet users to subscribe to websites that change or add content regularly. Web feeds in general provide web content or summaries of web content together with links to the full versions of the content, and other meta-data in a developer-friendly standardized format Atom, from a technical perspective, is an open standard that includes an XML-based web syndication format used by weblogs, news websites and web mail.

2. Definitions

The following definitions are used throughout this description:

Weblog or blog: a weblog is a website where an individual or group of individuals publishes posts periodically. The posts are usually displayed in reverse chronological order. Each post generally consists of: a date, a title, the body of the post, a permalink to the post, an author, and one or more categorizations.

Weblog entry: a post or a set of posts published on a specific day.

Post: item published to weblog at a specific time of day.

Weblog feed/syndication: weblogs may or may not make posts available via syndication using RSS or Atom feeds. Web feeds provide web content or summaries of web content together with links to the full versions of the content, and other metadata. Atom feeds are XML documents. In addition, there are several versions of the RSS standard in use.

Weblog host: a company or website that hosts weblogs for individuals. Examples of popular weblog hosts are: livejournal.com, xanga.com, spaces.msn.com, blogspot.com, and the family of per-country domain typepad hosts.

Weblog software: software that enables creation and publishing of weblog posts to a weblog host, or to a self-hosted weblog. Each weblog host has its own weblog software tool for publishing posts. In addition, there are a number of weblog software tools for publishing a self-hosted weblog, such as Typepad, Moveable Type, and Wordpress.

Weblog ping: A weblog ping is an XML-RPC mechanism that notifies a ping server, such as weblogs.com or blo.gs, that the weblog has changed (e.g., the author has written a new post). Many weblog software tools can be set (or are automatically pre-set) to ping centralized servers whenever the weblog is updated. Example ping servers are http://blogs/ping.php and http://rpc.technorati.com/rpc/pingl. Some ping servers accept "extended pings" that include both the URL and feed URL of the updated weblog.

Crawl: A web crawler (also known as a web spider or web robot) is a program which browses the World Wide Web in a methodical, automated manner. A web crawler is one type of bot, or software agent. In general, it starts with a list of URLs to visit, called the seeds. As the crawler visits these URLs, it identifies all the hyperlinks in the page and adds them to the list of URLs to visit, called the crawl frontier. URLs from the frontier are recursively visited according to a set of policies.

Screen scraping: a technique in which a computer program extracts data from the display output of another program. The program doing the scraping is called a screen scraper. The key element that distinguishes screen scraping from regular parsing is that the output being scraped was nominally intended for human consumption, not machine interpretation. There are a number of synonyms for screen scraping, including: Data scraping, data extraction, web scraping, page scraping, and HTML scraping (the last three being specific to scraping web pages).

Wrapper: a program that performs screen scraping.

"Document Object Model" (DOM): a description of how an HTML or XML document is represented in an object-oriented fashion. DOM provides an application programming interface to access and modify the content, structure and style of the document.

Permalink: a term used in the world of blogging to indicate a URL which points to a specific blog entry.

XPath (XML Path Language): a terse (non-XML) syntax for addressing portions of an XML document.

3. Process for Extracting Posts from a Weblog

Here we describe a process for extracting individual posts from a weblog, according to an exemplary embodiment of the present invention. First we describe the typical layout of a weblog.

3.1. Modelling Weblogs

FIG. 1 shows the home page of a well-known weblog. Notice the extraneous content on the page: header, footer (not displayed) and sidebars (in this example, ads). However, the main content is a sequence of entries ordered in reverse chronological order, with each entry consisting of sequence of posts, also in reverse chronological order.

A weblog can be described formally as follows:
Weblog: Entry+
Entry: Date Post+
Post: Title? Content Permalink? Author? Timestamp? Link to comments? Categories*

The ordering of the sub-elements for the Entry elements and the Post elements is typically not standardized across weblogs, although it is assumed to be fixed within a weblog.

Also, the model assumes that the entry dates are monotonically decreasing.

3.2. Weblog Syndication

Many weblog publishing software tools also publish a feed in association with the weblog. The feed is updated whenever a new item is posted to the weblog. The feed is a "pull" mechanism, as is the weblog page. As a "pull" mechanism, the feed is accessed in order to find out if the weblog has been updated. However, feeds are designed to be read via a feed reader/aggregator (such as Bloglines, NewsGator, etc. or via an extension to a mail reader), which polls the feed on the behalf of the user(s). Thus, the end user who reads feeds via a feed reader experiences weblogs as a "push" phenomena: the newly published weblog posts are pushed to the user's screen.

Some weblog software tools have provided customization of the weblog's feed: the publication of the feed can be turned on or off, the feed can be updated whenever a new item is posted or modified, and the feed can be full content or partial content. Full vs. partial content is an important distinction. We define a full content feed as a feed that publishes the entire content of the post as viewable on the front page of the weblog. We define a partial content feed as a feed that publishes a summary of the post content available via the weblog.

With respect to feed publication, weblog software tools fall into three categories: (1) automatic generation of feeds (partial or full); (2) customized generation of feeds; or (3) no feed generation capability. In the last case, some tech-savvy bloggers will use custom software to create a feed and associate it with their weblog, or turn to a third-party feed generator to host a feed for the weblog (e.g., FeedBurner: http://www.feedburner.com/).

3.3. Segmenting Weblogs into Posts

This section describes our approach for segmenting weblogs into posts, according to an exemplary embodiment of the present invention. It would be costly to manually create individual wrappers for each weblog. However, weblogs tend to conform to a common model, as described in Section 3.1 above. Thus, we have focused on developing an approach that generalizes well over the majority of weblogs.

If a full content feed is available for a weblog, then the task of extracting posts from the weblog is the straightforward mapping of the XML format to an internal format. If a partial content feed exists for a weblog, then we use the partial content to guide the extraction process. If no partial content feed exists for a weblog, then we apply a model-based approach to extracting posts from the weblog page, taking advantage of regularities more or less common to most weblogs. Our work on model-based segmentation is similar to that of Nanno et al. Nanno, Automatic collection and monitoring of Japanese weblogs, In Proceedings WWW-2004 Workshop on the Weblogging Ecosystem, New York City, N.Y., 2004 (incorporated herein by reference).

Accordingly, here is an outline of the algorithm used for extracting posts from a weblog, according to an exemplary embodiment of the present invention:
1. Crawl home page of weblog.
2. Discover feed(s) associated with weblog
3. For each feed:
    (a) Determine if feed satisfies minimal requirements for proceeding. Our feed finder considers an item in the feed sufficient if it contains, at minimum, the following fields: date-posted AND (content OR description).
    (b) If the feed is sufficient, classify the feed as full content or partial content.
    (c) If feed is full content, then we map the data found in the feed into a representation for weblog posts.
    (d) If feed is partial content, then use feed data to guide screen scraping of the weblog to construct a representation for weblog posts.
    (e) If the feed has insufficient content, then try next feed associated with weblog.
4. If there are no feeds with sufficient full or partial content, then fall back on screen scraping of weblog. Screen scraping uses a model-based approach to segment the weblog page into posts using textual and HTML elements of the page as markers.

3.4. Feed Discovery

After reaching the home page of the weblog, the first step consists of discovering the feed(s) for the weblog. If the weblog update was collected from a ping server relaying extended pings, and if the accepted ping includes the feed URL for the weblog, then we have located the feed. Alternatively, if the weblog is hosted by a weblog host which publishes full content feeds for its weblogs, then we need only map the weblog URL to the feed URL.

Otherwise, the next step in discovering the feed(s) for a weblog is to use "RSS auto-discovery." RSS auto-discovery is an agreed-upon standard for specifying the location(s) of a weblog feed(s) as metadata in the HTML for the weblog home page.

If RSS auto-discovery fails to find a set of feeds for the weblog, the next step is to search for links to feeds from body of the weblog. First, all hyperlinks are extracted from the weblog. Next, the set of extracted hyperlinks are filtered using a classifier to identify which one(s) belong to the set of feeds for the weblogs. Currently, we use a set of heuristics to identify the feed(s) for a weblog from the extracted hyperlinks. The following is a non-exclusive list of criteria that can be used to identify the feed:
- URLs that allow readers to subscribe to the feed in their RSS reader; these urls match "?url=?" or "bloglines.com/sub/"
- URLs with one of a set of common feed suffixes, including {"atom.xml", ".xml", ".rss", "rdf", . . . } AND matching the host name of the blog
- URLs with a host with one of a set of common feed prefixes, including {"xml", "rss", . . . } AND matching the domain name of the blog.

3.5. Full Content Vs. Partial Content Feeds

The multiple XML standards for weblog feeds (several versions of RSS and Atom) all satisfy the following minimal conditions:
- The feed has the following top-level fields: weblog url, weblog title
- The feed consists of a set of items (which for weblogs, correspond to posts). Each item may have the following fields: date-posted, permalink, post title, author, content, description Our feed finder considers an item in the feed content to be sufficient if it contains, at minimum, the following fields: date-posted AND (content OR description). If no items in the feed contain sufficient content, the feed is rejected and weblog segmentation falls back upon model-based weblog segmentation (aka screen scraping).

The actual names of the fields depend on the feed standard being used. For example, for RSS v0.91, date-posted maps onto the XPath/item/title; content maps onto the XPath/item/description; and description maps onto the XPath/item/description. (There is no separate content field in the RSS v0.91 specification.)

Typically, the description field is used to provide a summary of the post (usually the first few lines) while the content field is used to provide either the full content of the post or a summary. Some feeds contain both, in which case, typically, the description contains the summary and the content contains the full post.

The feed classifier, which classifies the feed as full content or partial content, takes as input features of the content and description text, such as: presence/absence of HTML tags, % posts ending in ellipses, and type of feed. Based on these features, it uses heuristics decides whether or not the items in the feed are full content. Other features could be added, such as the variance in the length of text, etc.

If the feed is classified as full content, then we map the data found in the feed into our own internal representation for weblog posts, using XML representation of the content of the post+meta-data. Elements in the XML representation include: weblog url, permalink, weblog title, post title, date posted, time posted, and content.

If the feed is not full content, then we create skeletal posts from the data in the feed. For each post, we fill in the following data: weblog url; date-posted; partial content; post title (if found); post author (if found); and permalink (if found).

3.6. Feed-Guided Weblog Segmentation

The next step is to fill in the skeletal posts constructed from the feed by using the content of the weblog page itself. Missing from the skeletal posts is the full content of the post. To find the full content, the partial content is first processed to remove summarization artifacts (e.g., ending ellipsis). Then, we search for the partial content in the weblog. If the partial content is not found, then we will omit that particular post from our segmentation because not enough information can be located to construct the post. If we end up finding insufficient information on all posts, then we will fall back on model-based segmentation.

If the partial content matches text on the weblog home page, then we find the enclosing node for the matching text in the tidied XHTML for the weblog page. The Extensible HyperText Markup Language, or XHTML, is a markup language that has the same expressive possibilities as HTML, but a stricter syntax. The text inside the enclosing node is then used as the content for the post. If enclosing nodes for successive posts overlap, then we throw an error indicating that feed-guided segmentation has failed for the weblog, and, again, fall back on model-based segmentation.

3.7. Model-Based Weblog Segmentation

If there are no feeds with sufficient full or partial content, then we attempt to segment the weblog into posts using screen scraping of the weblog. Screen scraping uses a model-based approach to segment the weblog page into posts using textual and HTML elements of the page as markers.

Model-based weblog segmentation assumes that weblogs can be modeled as described in Section 3.1. Our approach then starts from a simplification of that model: (date ([title] content)+)+. This model assumes that dates appear first. This means that if we are able to extract the weblog entry dates, then we can use the dates as markers for the entries. Of course, a weblog page may have many other dates apart from the dates marking the entries: dates in the content of the posts; dates in the sidebars or in other non-weblog content included in the HTML page. However, as weblogs are produced by weblog software, we can expect certain regularities in the underlying DOM of the generated HTML. In particular, we expect that the relative XPaths of the weblog entry dates to be identical. A relative XPath is an Xpath that is defined relative to a location (XML node) in an XML document. In practice we've found that the relative XPaths of the entry dates are identical if we ignore certain elements in the XPath:/align/and repeating/font/s.

The first step in our model-based segmentation algorithm consists of extracting all the dates from the tidied XHTML for the weblog page using a date extractor. The dates are sorted into ordered lists, one list for each unique relative XPath. The order within the list corresponds to the ordering of the dates with the DOM for the weblog page.

We then filter the lists according to a set of heuristics in order to identify which list corresponds to the actual weblog entry dates. The filtering process for the date lists can be performed using the following sequence of steps:

1. Keep only lists whose dates all belong to the current year and/or the past year.
2. Keep only non-singleton date lists.
3. Keep only lists whose dates conform to a similar format (e.g. MM/DD/YYYY).
4. Keep only lists whose dates decrease monotonically.
5. Keep only lists with most recent dates (but not in the future).
6. Keep only lists with longest date string representation.
7. Keep only lists with the greatest number of dates.
8. Keep only first list.

One might think that after step 5 in the filtering process, we would be left with at most one list of dates. In practice, this is frequently not the case, because weblogs often have a sidebar with a dated list of recent posts which corresponds exactly the full set of posts in the main part of the weblog. The last few filtering steps help correctly identify the weblog entry dates as opposed to the dates in the sidebar.

If we fail to find a conforming list of dates, then model-based segmentation fails. There are some known cases where our approach fails: when only one entry appears on the home page of the weblog; or when weblog software for some reason generates irregular XPaths for the dates and/or content. But in many cases, segmentation fails when the HTML page in question is not actually a weblog. Thus, our model-based segmentation algorithm has the additional functionality of serving as a classifier that identifies whether or not an HTML page is indeed a weblog.

Once we have identified the entry dates for the weblog, model-based segmentation proceeds as follows:

1. Segment weblog into entries, using dates as markers.
2. Segment each weblog entry into posts using post titles markers.
3. For each post, identify permalink and author.

In step 1, we assume that all DOM nodes between subsequent entry dates form the weblog entry associated with the earlier date. The main difficulty is identifying the end of the last post. For this we use a set of heuristics to identify the end of the blog entry by looking for the start of boilerplate weblog end template. Example end markers include: the start of a sidebar, a copyright notice, or a form, or a comment. Another heuristic for finding the end of the blog entry is to look for a node in the DOM whose XPath is analogous in structure to the XPath of the last node in the previous weblog entry.

In step 2, we attempt to use post titles to demarcate boundaries between posts for an entry. First, we iterate over the nodes of the entry searching for a node that matches one of our conditions for being a title node. These conditions include: class attribute of the node equals 'title' or ' subtitle' or 'blogpost', etc. Once we have found the first matching title, we then assume that all subsequent post titles will have the same relative XPath. Again, we assume that all DOM nodes between subsequent title nodes are associated with the earlier title.

If we are unable to find titles, then we treat the entire entry as a single post. In fact, we have found that the majority of bloggers do not post more than once per day.

The final post-processing step identifies the permalink and author from the content of each extracted post using common patterns for permalinks and author signatures. To find authors, we look for patterns like "posted by." To find permalinks, we look for hrefs (hyperlinks) in the post content that match, for example, "comment" or "archive." Some patterns are given higher priority than others for matching against permalinks.

A weakness of our current implementation of model-based wrapper segmentation is that it assumes that the date field comes first in a weblog entry. In fact, while most blogs exhibit the pattern date ([title] content)+, others use (title date content)+ or even ([title] content date)+. Our approach is still able to segment blogs exhibiting these less common patterns, although the segmentation associates the date with the incorrect content. That is, if we have a sequence of N posts (post 1 through post N), the date for post 1 will be associated with the content of post 2 and so on. In addition, we will fail to extract the content of post 1. We call this error a parity error.

4. Segmentation Statistics

We have implemented weblog segmentation as part of the BlogPulse weblog post collection, indexing and search system.

In tests of the model-based segmentation algorithm, we have found that the precision of this algorithm is about 90%—that is about 90% of extracted posts have date, title and content fields that correspond to those of actual posts on the weblogs. The recall is approximately 70%—that is, we are able to extract posts from about 70% of true weblogs.

TABLE 1

| Segmentation statistics for Apr. 13, 2005 | |
|---|---|
| Segmentation method | % of weblogs |
| Full content feed | 78% |
| Feed-guided segmentation | 11% |
| Model-based segmentation | 11% |

Table 1 shows the statistics for our segmentation process, the percentage of weblogs segmented using: (1) full content feeds (78%); (2) feed-guided segmentation (11%); or (3) model-based segmentation (11%).

We have implemented our segmentation algorithm as part of the weblog post collection subsystem of BlogPulse. This enables BlogPulse to provide search over individual blog posts. Furthermore, the corpus of dated weblog posts serves as a data set for tracking trends over time, and for analyzing how memes spread through the blogosphere.

Having described the invention with reference to embodiments, it is to be understood that the invention is defined by the claims, and it is not intended that any limitations or elements describing the embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. An apparatus, comprising:
at least one memory;
instructions; and
processor circuitry to execute the instructions to:
    access a home page of a weblog;
    identify a feed associated with the weblog;
    determine whether items in the feed contain sufficient content for feed-guided segmentation;
    when the items in the feed contain sufficient content for feed-guided segmentation, determine whether the items in the feed contain full content of the weblog;
    when the items in the feed contain full content of the weblog, map data found in the feed into a representation of a weblog post; and
    when the items in the feed contains partial content, screen scrape the weblog into the representation of the weblog post.

2. The apparatus of claim 1, wherein the processor circuitry is to execute the instructions to receive a feed URL for the weblog from a ping relayed by a ping server from which a weblog update is collected.

3. The apparatus of claim 1, wherein the processor circuitry is to execute the instructions to, when the weblog is hosted by a weblog host that publishes a full content feed for the weblog, map a URL of the weblog to a feed URL.

4. The apparatus of claim 1, wherein the processor circuitry is to execute the instructions to use RSS auto-discovery to identify a URL of the feed from metadata in HTML, for the home page of the weblog.

5. The apparatus of claim 1, wherein the processor circuitry is to execute the instructions to:
    extract a set of hyperlinks from a body of the weblog; and
    filter the set of extracted hyperlinks to identify hyperlinks that belong to the feed for the weblog.

6. The apparatus of claim 5, wherein the processor circuitry is to execute the instructions to use a set of heuristics to filter the set of extracted hyperlinks to identify the feed for the weblog from the extracted hyperlinks.

7. The apparatus of claim 5, wherein the processor circuitry is to execute the instructions to identify the feed for the weblog based on at least one of a URL that allow readers to subscribe to the feed in an RSS reader, a URL matching a host name of the weblog and having a common feed suffix including at least one of atom.xml, .xml, .rss, or rdf, or a URL matching a domain name of the weblog and having a common feed prefix including at least one of xml or rss.

8. The apparatus of claim 1, wherein the processor circuitry is to execute the instructions to determine the feed contains content for feed-guided segmentation when an item in the feed contains a date field and at least one of a content field or a description field.

9. The apparatus of claim 1, wherein the processor circuitry is to execute the instructions to determine whether the feed contains full content or partial content of the weblog based on heuristics and features of content and description text in the feed.

10. The apparatus of claim 9, wherein the features of the content and the description text include at least one of a presence or absence of HTML, tags, a percent of posts ending in ellipses, or a type of feed.

11. The apparatus of claim 1, wherein the processor circuitry is to execute the instructions to, when the feed contains partial content of the weblog, create the representation of the weblog post based on data available from the feed.

12. The apparatus of claim 11, wherein the representation includes at least one of a URL of the weblog, a date on which the weblog post was posted, partial content of the weblog post, a title of the weblog post, an author of the weblog post, or a permalink of the weblog post.

13. The apparatus of claim 12, wherein the processor circuitry is to execute the instructions to search the home page of the weblog for content matching the representations.

14. The apparatus of claim 13, wherein the processor circuitry is to execute the instructions to:
  upon finding content on the home page of the weblog matching the representations, identify an enclosing node associated with the content matching the representations in extensible HyperText Markup Language (XHTML) for the home page of the weblog; and
  extract text contained within the enclosing node to supplement the representation.

15. The apparatus of claim 12, wherein the processor circuitry is to execute the instructions to exclude summarization artifacts and advertisements from the representations.

16. The apparatus of claim 1, wherein the processor circuitry is to execute the instructions to extract dates from XHTML for a page of the weblog, and wherein when the feed contains insufficient content for feed-guided segmentation, the processor circuitry is to execute the instructions to:
  sort the extracted dates into ordered lists, each ordered list corresponding to a relative XPath;
  filter the ordered lists according to a set of heuristics to determine which of the lists correspond to entry dates of the weblog post;
  segment the weblog into entries based on dates from the determined list as markers for the entries;
  extract the weblog post from the weblog entries based on post title markers; and
  identify a permalink and an author for the weblog post.

17. The apparatus of claim 16, wherein, to filter the ordered lists based on the set of heuristics, the processor circuitry is to execute the instructions to:
  extract lists whose dates all belong to the current year or the past year;
  extract non-singleton date lists;
  extract lists including dates that conform to a similar format;
  extract lists including dates that decrease monotonically;
  extract lists with most recent dates and without future data;
  extract a list with a longest date string representation;
  extract a list with a greatest number of dates; and
  extract a first list.

18. The apparatus of claim 16, wherein the processor circuitry is to execute the instructions to segment the weblog into entries based on a set of heuristics to identify an end of the weblog entries.

19. The apparatus of claim 18, wherein the set of heuristics includes at least one of a start of a sidebar on the page of the weblog, a copyright notice on the page of the weblog, a form, or a comment.

20. The apparatus of claim 19, wherein the processor circuitry is to execute the instructions to detect a node in a document object model whose XPath is analogous in structure to an XPath of a last node in a previous weblog entry.

21. The apparatus of claim 19, wherein the processor circuitry is to execute the instructions to:
  search nodes of an entry to identify a title node;
  determine that titles of subsequent posts have a same relative XPath as the title node identified in searching the nodes of the entry; and
  in response to failing to identify a title node, determine that the entry is a single post.

22. The apparatus of claim 21, wherein the processor circuitry is to execute the instructions to identify the title node when a class attribute of the node is at least one of a title, a subtitle, or a blogpost.

23. The apparatus of claim 16, wherein, to identify the permalink and author, the processor circuitry is to execute the instructions to identify hrefs in content of the weblog post that match.

24. The apparatus of claim 16, wherein, to identify the permalink and author, the processor circuitry is to execute the instructions to identify patterns indicative of an author byline.

25. A computer readable storage device or storage disc comprising instructions that, when executed, cause a machine to at least:
  access a home page of a weblog;
  identify a feed associated with the weblog;
  determine whether the feed contains sufficient content for feed-guided segmentation;
  when the feed contains sufficient content for feed-guided segmentation, determine whether the feed contains full content or partial content of the weblog;
  when the feed contains full content of the weblog, map data found in the feed into a representation of a weblog post; and
  when feed contains partial content of the weblog, screen scrape the weblog into the representation of the weblog post.

* * * * *